S. B. MILLER.
Stalk-Cutters.
No. 137,707. Patented April 8, 1873.
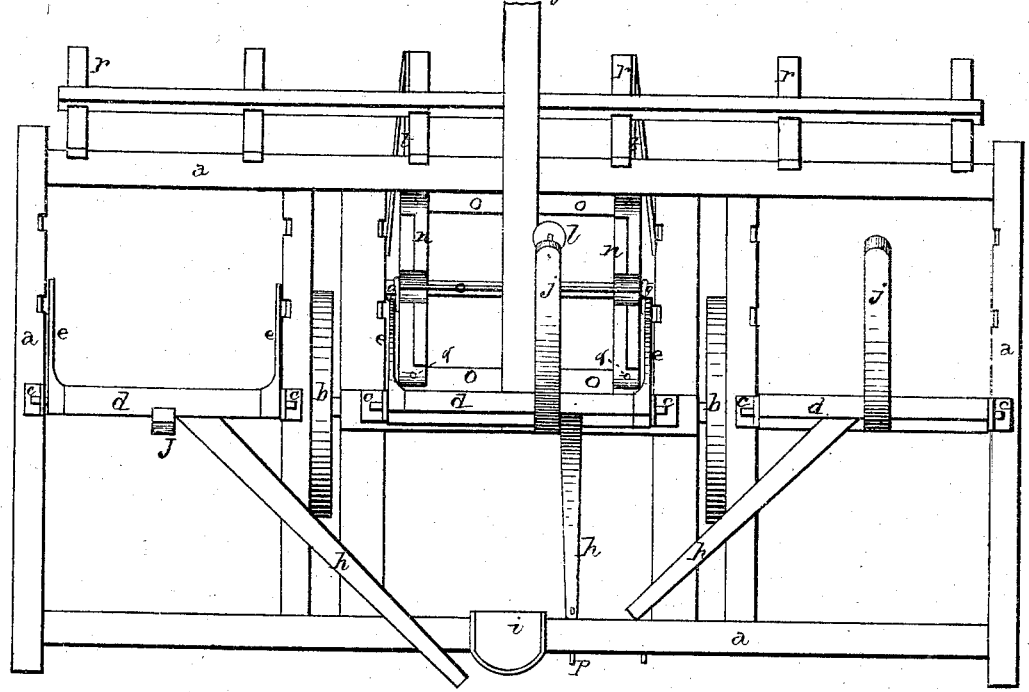
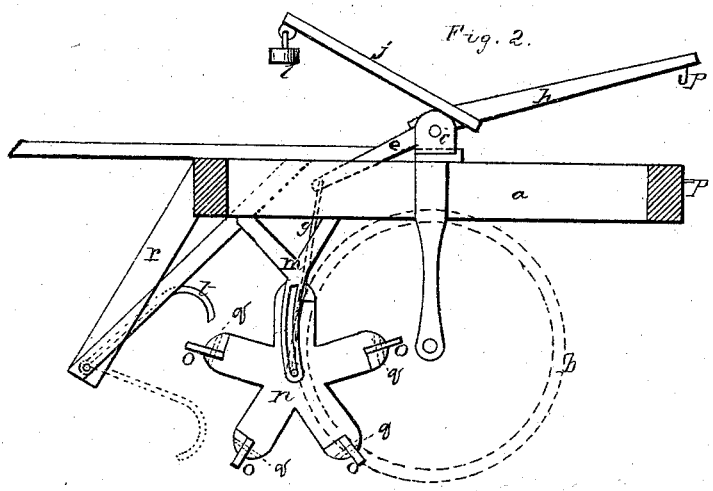
WITNESSES.
W. K. Duhamel
Alex Davidson
INVENTOR.
Saml. B. Miller
Per H. S. Abbot.
atty.

UNITED STATES PATENT OFFICE.

SAMUEL B. MILLER, OF STANWOOD, IOWA.

IMPROVEMENT IN STALK-CUTTERS.

Specification forming part of Letters Patent No. 137,707, dated April 8, 1873; application filed February 7, 1873.

*To all whom it may concern:*

Be it known that I, SAMUEL B. MILLER, of Stanwood, county of Cedar and State of Iowa, have invented certain new and useful Improvements in Stalk-Cutters, of which the following is a specification:

The nature of my invention consists in, first, rotary cutters suspended in slotted arms and having a vertical and independent movement, so as to adjust themselves to the irregularities of the ground; second, in weighted levers, so as to increase the weight of the cutters in cutting wet or damp stalks; third, in the clamps by which the cutting-knives are held; fourth, in drag-hooks arranged on each side of the cutters so as to draw the stalks under them, all of which will be more fully set forth and described hereafter.

Figure 1 represents a plan view of my machine; Fig. 2, a cross-section of the same.

$a$ represents the frame, made in any desired shape or form, and supported by the wheels $b$. Journaled in the boxes or bearings $c$, secured to the tops of the cross-timbers of the frame, are the bars $d$, to which the cutters are attached by means of the arms or levers $e$ and rods $g$. To these bars, of which there will be one for each cutter, there is secured a hand-lever, $h$, by which the cutters are raised and lowered, and which extend back within reach of the driver sitting on the seat $i$, and a lever, $j$, which extends upward and forward toward the front of the machine, and to which a weight, $l$, will be attached when desired.

To each machine I propose attaching three cutters, arranged side by side, and each having an independent vertical adjustment of its own in the slotted arms or guides $m$, so as to adjust themselves to the inequalities of the ground. These cutters consist of the clamps $n$, made in two halves, and the knives $o$. The clamps, made of metal in two pieces, are put together, as shown in Fig. 1, clamping the knives $o$ securely between their ends, as shown in Fig. 2.

By this construction the knives are held without the liability of a constant loosening and breaking of the bolts; but even if one of the bolts should break the shoulders, formed in each point, will hold the knife securely in place.

These clamps, being made of metal, are usually heavy enough to cause the knives to cut the stalks as they pass over them; but when it is necessary to cut wet or damp ones, then the weights $l$ are attached to the ends of the levers $j$, which, for each pound, give a pressure to the knives of three pounds, more or less, the pressure being greatest when the lever $j$ varies most from an upright position, lessening the amount of dead weight to be carried, and, by its jerking action, preventing a dull roll to the cutters.

In going to or from the field, or in passing over obstructions, the driver, by means of the levers $h$, can raise the cutters from the ground, and keep them thus suspended by means of any suitable catches $p$.

Secured to the front of the frame are a number of bars, $r$, strongly braced in any suitable manner, and to which are secured the hooks which drag along the ground, one on each of the cutters, and draw the stalks directly under the knives.

Having thus described my invention, what I claim as new, and desire to secure by Letters Patent, is—

1. The bar $d$, having lever $h$ and arm $e$ provided with rod $g$, in combination with cutting device, substantially as shown and described.

2. The combination of the lever $j$, weight $l$, bar $d$, arm $e$, rod $g$, and cutters, when all are arranged to operate substantially as shown and described.

In testimony that I claim the foregoing as my invention I hereunto affix my signature this 7th day of February, 1873.

SAML. B. MILLER.

Witnesses:
W. K. DUHAMEL,
ALEX. S. DAVIDSON.